United States Patent
Huberman et al.

(10) Patent No.: US 10,050,767 B2
(45) Date of Patent: Aug. 14, 2018

(54) SYSTEM AND METHOD FOR MULTIPLE-INPUT AND MULTIPLE-OUTPUT (MIMO) FULL-DUPLEX PRECODING ALGORITHMS

(71) Applicant: Huawei Technologies Canada Co., Ltd., Kanata (CA)

(72) Inventors: Sean Huberman, Nepean (CA); Tho Le-Ngoc, Montreal (CA)

(73) Assignee: HUAWEI TECHNOLOGIES CANADA CO., LTD., Kanata, Ontario (CA)

( * ) Notice: Subject to any disclaimer, the term of this patent is extended or adjusted under 35 U.S.C. 154(b) by 335 days.

(21) Appl. No.: 14/858,005

(22) Filed: Sep. 18, 2015

(65) Prior Publication Data
US 2017/0085358 A1    Mar. 23, 2017

(51) Int. Cl.
*H04L 5/14* (2006.01)
*H04B 7/04* (2017.01)
(Continued)

(52) U.S. Cl.
CPC ........... *H04L 5/1461* (2013.01); *H04B 1/525* (2013.01); *H04B 7/0456* (2013.01); *H04B 7/0617* (2013.01)

(58) Field of Classification Search
CPC .... H04B 7/0456; H04B 7/0617; H04L 5/1461
See application file for complete search history.

(56) References Cited

U.S. PATENT DOCUMENTS 8,498,585 B2   7/2013  Vandenameele
8,570,933 B2  10/2013  Lioliou et al.
(Continued)

FOREIGN PATENT DOCUMENTS

CN    101882965 A    11/2010
CN    104052529 A     9/2014
(Continued)

OTHER PUBLICATIONS

Auer, G., et al., "How Much Energy is Needed to Run a Wireless Network?," Technologies for Green Radio Communication Networks, IEEE Wireless Communications, Oct. 2011, pp. 40-49.
(Continued)

*Primary Examiner* — Ross Varndell
(74) *Attorney, Agent, or Firm* — Slater Matsil, LLP

(57) ABSTRACT

Embodiments are provided to enable effective cancellation or reduction of the self-interference (SI) introduced when applying full-duplex transmission to MIMO systems. A method embodiment includes forming, using a first component matrix of a precoding matrix generated in accordance with signal channel conditions, a plurality of beams for a plurality of transmit signals, and forming, using a second component matrix of the precoding matrix, a plurality of SI cancellation signals corresponding to the transmit signals. The first component matrix is arranged to maximize a sum-rate of transmissions in the transmit signals assuming zero SI in the network component. The second component matrix is arranged to maximize SI suppression in a plurality of receive signals in the network component. The beams are transmitted at a plurality of antennas, also used to receive the receive signals. The SI cancellation signals are added to the receive signals to detect corrected receive signals.

24 Claims, 7 Drawing Sheets

(51) Int. Cl.
*H04B 7/0456* (2017.01)
*H04B 1/525* (2015.01)
*H04B 7/06* (2006.01)

(56) References Cited

U.S. PATENT DOCUMENTS

| | | | | |
|---|---|---|---|---|
| 9,391,680 | B2* | 7/2016 | Le-Ngoc | H04B 7/0456 |
| 9,608,706 | B2* | 3/2017 | Le-Ngoc | H04B 7/0456 |
| 9,723,566 | B2* | 8/2017 | Khojastepour | H04W 52/14 |
| 9,793,967 | B2* | 10/2017 | Murch | H04B 7/0452 |
| 2013/0155912 | A1 | 6/2013 | Khojastepour et al. | |
| 2015/0139347 | A1* | 5/2015 | Murch | H04B 7/0456 375/267 |
| 2015/0244436 | A1* | 8/2015 | Le-Ngoc | H04B 7/0456 375/267 |
| 2015/0381334 | A1* | 12/2015 | Khojastepour | H04W 52/14 370/296 |
| 2015/0381335 | A1* | 12/2015 | Khojastepour | H04W 52/14 370/278 |
| 2016/0323023 | A1* | 11/2016 | Le-Ngoc | H04B 7/0456 |

FOREIGN PATENT DOCUMENTS

| | | |
|---|---|---|
| WO | 2015073937 A1 | 5/2015 |
| WO | 2015131116 A1 | 9/2015 |

OTHER PUBLICATIONS

Chen, Y., et al., "Energy Saving: Scaling Network Energy Efficiency Faster than Traffic Growth," 2013 IEEE WCNC Workshop on Future gReen End-to-End Wireless Network, Apr. 7-10, 2013, pp. 12-17.

Frenger, P., et al., "Reducing Energy Consumption in LTE with Cell DTX," 2011 IEEE 73rd Vehicular Technology Conference (VTC Spring), May 15-18, 2011, 5 pages.

Huberman, S., et al., "MIMO Full-Duplex Precoding: A Joint Beamforming and Self-Interference Cancellation Structure," Wireless Communications, IEEE Transactions on Wireless Communications, Apr. 2015, vol. 14, Issue: 4, 13 pages.

Masmoudi, A., et al., "Self-Interference Channel Estimation and Cancellation for Full-Duplex Communications Systems," Department of Electrical and Computer Engineering, McGill University, Montreal, Quebec, Canada, received May 13, 2014, 11 Pages.

Nakamura, T., "LTE Enhancements and Future Radio Access," The 5th Future of Wireless International Conference, Jul. 1-2, 2013, 15 pages.

* cited by examiner

SYSTEM AND METHOD FOR MULTIPLE-INPUT AND MULTIPLE-OUTPUT (MIMO) FULL-DUPLEX PRECODING ALGORITHMS

TECHNICAL FIELD

The present invention relates to wireless communications and networking, and, in particular embodiments, to a system and method for Multiple-Input and Multiple-Output (MIMO) Full-Duplex precoding algorithms.

BACKGROUND

In transmission systems, Half-Duplex (HD) transmission refers to transmitting and receiving signals, but either not at the same time or not over the same frequency resource. In contrast, with Full-Duplex (FD) transmission, the signals are transmitted and received simultaneously over the same frequency resource at the same time. FD transmission has the potential to provide approximately double sum-rate improvements over HD transmission. However, FD transmission suffers from high self-interference. Self-interference refers to the noise added to the detected received signal due to a portion of the device transmitted signal propagating into the receiver of the same device. Transmission systems can also employ a Multiple-Input-Multiple-Output (MIMO) scheme where multiple antennas in a device are used at both the transmitter and receiver to improve communication performance. The MIMO technique allows high data throughput and link range in comparison to single antenna transmission techniques. This is achieved by spreading the same total transmit power over the multiple antennas to achieve an array gain that improves the spectral efficiency (more bits per second per hertz of bandwidth) and/or to achieve a diversity gain that improves the link reliability. A transmission system, such as in current and fifth generation (5G) radio access networks (RANs) or in WiFi networks, can benefit from implementing both MIMO and FD transmission schemes to achieve high transmission rates and throughput. However, the large rate and throughput requirements make device communications highly susceptible to noise, particularly the high self-interference noise associated with FD transmissions. Therefore, there is a need for effective schemes to realize the benefits of FD operation with the MIMO scheme and mitigate self-interference in such systems.

SUMMARY OF THE INVENTION

In accordance with an embodiment, a method performed by a network component for full-duplex communications in a Multiple-Input and Multiple-Output (MIMO) system including forming, using a first component matrix of a precoding matrix generated in accordance with signal channel conditions, a plurality of beams for a plurality of transmit signals. The first component matrix is arranged to maximize a sum-rate of transmissions in the transmit signals assuming zero self-interference (SI) in the network component. The method further includes forming, using a second component matrix of the precoding matrix, a plurality of SI cancellation signals corresponding to the plurality of transmit signals. The second component matrix is arranged to maximize SI suppression in a plurality of receive signals in the network component. The method further includes transmitting, at a plurality of antennas, the plurality of beams for the transmit signals, receiving, via the plurality of antennas, the plurality of receive signals, and adding, to each of the plurality of receive signals, a corresponding SI cancellation signal to obtain a plurality of corrected receive signals. The plurality of corrected receive signals are then detected at a plurality of receivers.

In accordance with another embodiment, a network component for full-duplex communications in a MIMO system includes a processor and a non-transitory computer readable storage medium storing programming for execution by the processor. The programming includes instructions to form, using a first component matrix of a precoding matrix generated in accordance with signal channel conditions, a plurality of beams for a plurality of transmit signals, and form, using a second component matrix of the precoding matrix, a plurality of SI cancellation signals corresponding to the plurality of transmit signals. The first component matrix is arranged to maximize a sum-rate of transmissions in the transmit signals assuming zero SI in the network component, and the second component matrix is arranged to maximize SI suppression in a plurality of receive signals in the network component. The network component also includes a plurality of antennas configured to transmit the plurality of beams for the plurality of transmit signals and to receive a plurality of receive signals, and a plurality of combiners or couplers configured to add, to each of the plurality of receive signals, a corresponding self-interference cancellation signal to obtain a plurality of corrected receive signals. The network component also includes a plurality of receivers configured to detect the plurality of corrected receive signals.

In accordance with another embodiment, a method performed by a network component for full-duplex communications in a MIMO system includes calculating a sequential convex approximation function in accordance with an objective sum-rate for a plurality of transmit signals. The sequential convex approximation function is a function of a transmit covariance matrix in accordance with the transmit signals, a channel gain matrix, and a SI matrix corresponding to the transmit signals. The method further includes updating the transmit covariance matrix by minimizing the sequential convex approximation function, and repeating the calculating and updating steps until the sequential convex approximation function reaches convergence. The transmit covariance matrix is decomposed using Cholesky decomposition. The method further includes evaluating a full-duplex precoding (FDP) matrix in accordance with the decomposing of the transmit covariance matrix and forming, using the FDP matrix, a plurality of beams for the transmit signals and a plurality of SI cancellation signals corresponding to the plurality of transmit signals.

In accordance with another embodiment, a network component for full-duplex communications in a MIMO system includes a processor and a non-transitory computer readable storage medium storing programming for execution by the processor. The programming includes instructions to calculate a sequential convex approximation function in accordance with an objective sum-rate for a plurality of transmit signals. The sequential convex approximation function is a function of a transmit covariance matrix in accordance with the transmit signals, a channel gain matrix, and a SI matrix corresponding to the transmit signals. The programming includes further instructions to update the transmit covariance matrix by minimizing the sequential convex approximation function, repeat the calculating and updating steps until the sequential convex approximation function reaches convergence, and decompose the transmit covariance matrix using Cholesky decomposition. Further instructions are also included to evaluate an FDP matrix in accordance with the decomposing of the transmit covariance matrix, and form, using the FDP matrix, a plurality of beams for the transmit signals and a plurality of SI cancellation signals corresponding to the plurality of transmit signals.

In accordance with another embodiment, a method performed by a network component for full-duplex communications in a MIMO system includes calculating transmission rates of a plurality of transmit signals as a function of a transmit covariance matrix in accordance with the transmit signals, a channel gain matrix, and a SI matrix corresponding to the transmit signals. The method further includes calculating a sequential convex approximation function in accordance with an objective sum-rate for the transmit signals with the calculated transmission rates, updating the transmit covariance matrix by minimizing the sequential convex approximation function, and repeating the calculating and updating steps until the sequential convex approximation function reaches convergence. The method also includes decomposing the transmit covariance matrix using Cholesky decomposition, evaluating an FDP matrix in accordance with the decomposing of the transmit covariance matrix, and forming, using the FDP matrix, a plurality of beams for the transmit signals and a plurality of SI cancellation signals corresponding to the transmit signals.

In accordance with yet another embodiment, a network component for full-duplex communications in a MIMO system includes a processor and a non-transitory computer readable storage medium storing programming for execution by the processor. The programming includes instructions to calculate transmission rates of a plurality of transmit signals as a function of a transmit covariance matrix in accordance with the transmit signals, a channel gain matrix, and a SI matrix corresponding to the transmit signals, and calculate a sequential convex approximation function in accordance with an objective sum-rate for the transmit signals with the calculated transmission rates. The programming includes further instructions to update the transmit covariance matrix by minimizing the sequential convex approximation function, and repeat the calculating and updating steps until the sequential convex approximation function reaches convergence. Further instructions are also included to decompose the transmit covariance matrix using Cholesky decomposition, evaluate an FDP matrix in accordance with the decomposing of the transmit covariance matrix, and form, using the FDP matrix, a plurality of beams for the transmit signals and a plurality of SI cancellation signals corresponding to the transmit signals.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In MIMO systems, algorithms are used to calculate a precoding channel matrix to determine the transmission of multiple channels to multiple users and avoid (or substantially reduce) signal interferences between the different receiving user equipment devices (UEs). Typical MIMO systems use HD transmissions. Applying FD transmission to MIMO systems can provide approximately double sum-rate improvements over standard HD MIMO systems. However, the FD transmission scheme typically suffers from high self-interference (SI).

Embodiments are provided herein to enable effective cancellation, reduction, or suppression of the SI introduced when applying FD transmission to the MIMO system. The embodiments include using an FD precoding structure and an effective SI mitigation scheme that can be implemented in MIMO systems. A MIMO FD precoding structure is used, which provides both beam-forming for the transmit channel and SI suppression using precoding. Embodiments of the FD precoding algorithms by the structure are described below. The schemes herein are applicable for the Orthogonal Frequency-Division Multiplexing (OFDM) transmission format or other suitable modulation formats. The precoding structure allows for various precoding algorithms and different optimization criteria/objectives to be developed for both single-user and multi-user MIMO FD systems.

Figure 1:
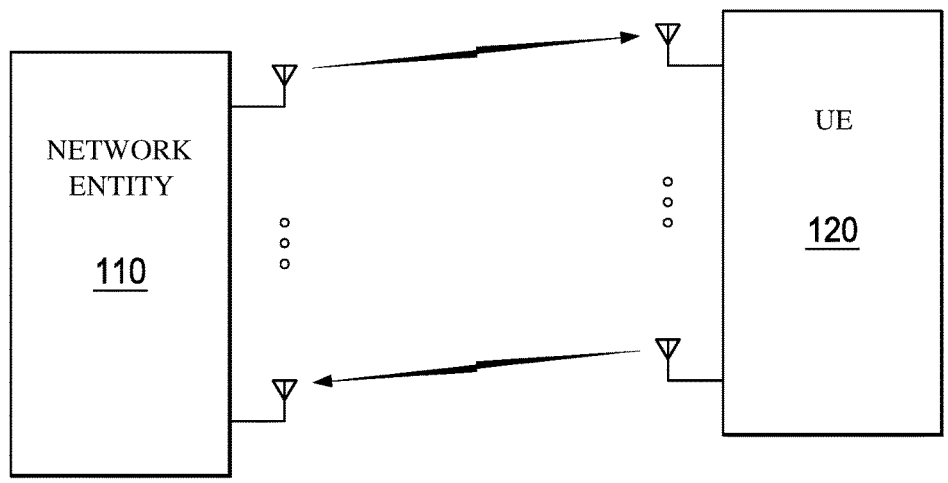
FIG. 1 illustrates a full-duplex single-user MIMO point-to-point system.

FIG. 1 illustrates an FD MIMO point-to-point system for single user communications. The FD single-user MIMO system includes a network entity 110 that serves a user equipment (UE) 120. The system may also include a second network entity 110 that similarly communicates with the UE 120 in a point-to-point link. Examples of the network entity 110 include a nodeB, an evolved nodeB (eNB), other base stations, a WiFi transmission point (TP), or any other type of network node capable of exchanging wireless signals with the UE 120. Examples of the UE 120 include a smartphone, other mobile phones, a laptop computer, a computer tablet, a sensor device, or any other suitable device capable of exchanging wireless signals with the network entity 110.

Both the network entity 110 and the UE 120 can communicate with multiple antennas according to the MIMO scheme. The multiple MIMO antennas allow the network entity 110 and the UE 120 to transmit and/or receive multiple signals simultaneously with the other entity. The multiple signals can correspond to multiple communication channels between the two devices. A channel signal can also be split into multiple component signals to be sent by the multiple antennas. For example, a high-rate signal can be split into lower-rate signals transmitted by the multiple antennas at one end. At the receiver end, the lower-rate signals are received by multiple antennas and then combined to obtain the original signal.

The multiple antenna MIMO transmissions are realized by precoding the signals or signal components to establish a plurality of directed beams between the transmitting and receiving devices. The precoding process determines signal parameters, such as signal amplitudes, phases, and orientation angles, to direct multiple signal beams by the antennas. This process is also referred to as beam-forming. The multiple beams are sent on multiple directions between the antennas of the transmitting device and the receiving device. As such, multiple signals can be transmitted simultaneously with controlled interference across the signals.

In addition to supporting MIMO transmission, the network entity 110 and the UE 120 implement FD transmission (i.e., each can transmit and receive signals at the same time) using an FD precoding structure and suitable precoding, as described below. Specifically, the components of the FD precoding structure are arranged to cancel or limit noise due to SI, which may be caused by the device transmitted signals propagating into the device receiver and affecting detection of the actual received signal.

Figure 2:
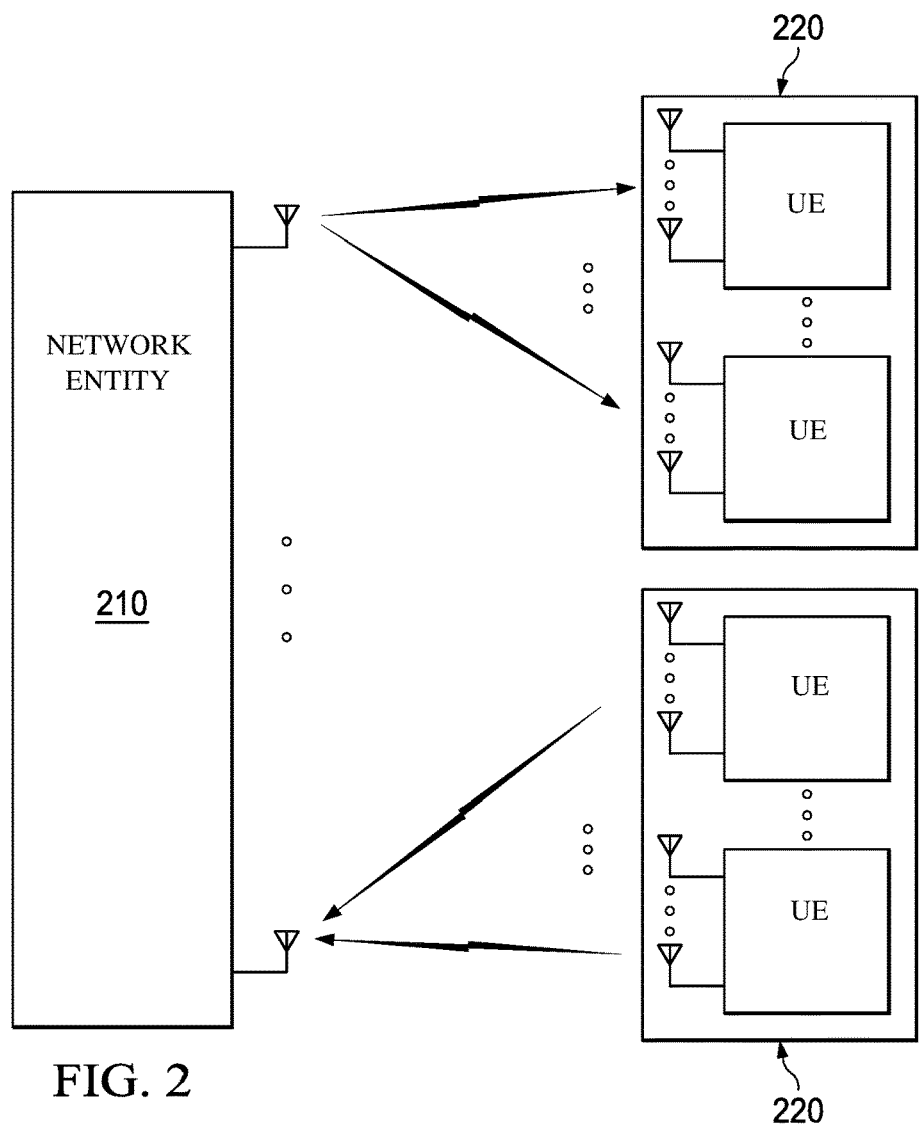
FIG. 2 illustrates a full-duplex multi-user MIMO point-to-multipoint system with half-duplex user equipment.

FIG. 2 illustrates an FD multi-user MIMO system with HD UEs. This system includes a network entity 210 (e.g., a base station) that serves multiple UEs 220. The network entity 210 and UEs 220 use multiple antennas according to the MIMO scheme. The system may include a second network entity 210 that similarly communicates with the HD UEs 220 in point-to-multipoint links. In this scenario, the network entity 210 can communicate with each UE 220 using FD transmission, while each UE 220 communicates with the network entity 210 using HD transmission. For example, the UE can either transmit or receive, through its antennas, at any particular moment, while the network entity 210 can operate in FD to transmit and receive simultaneously to different UEs. The network entity 210 may need to mitigate high SI due to the FD operation. This can be achieved at the network entity 210 using the FD precoding structure described below. SI may be less of a concern for HD UEs 220 which may suffer from signal interference from neighboring UEs 220.

Figure 3:
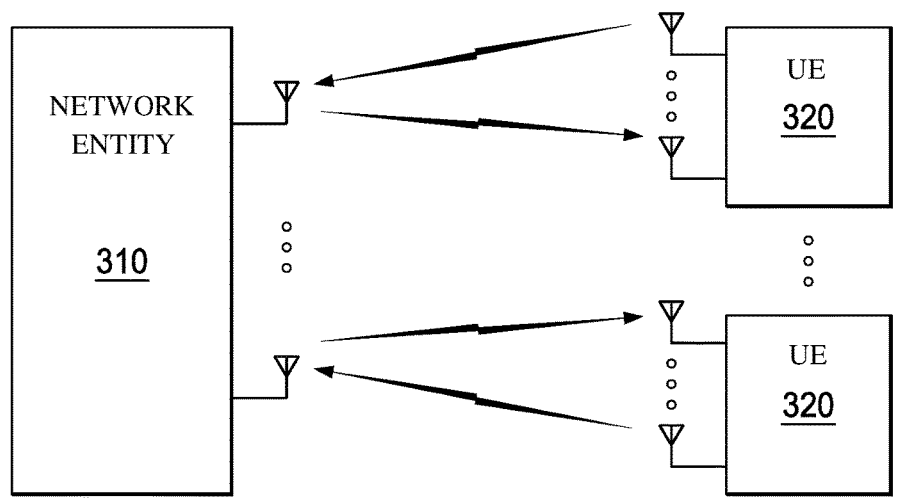
FIG. 3 illustrates a full-duplex multi-user MIMO point-to-multipoint system with full-duplex user equipment.

FIG. 3 illustrates an FD MIMO point-to-multipoint system with FD UEs. The system may include a second network entity 310 that similarly communicates with the FD UEs 320 in point-to-multipoint links. In this scenario, each of the network entity 310 and the UEs 320 can communicate using FD transmission with multiple antennas for MIMO. At each device, the FD transmissions are implemented using the FD precoding structure described below with suitable precoding. The system may also include HD UEs (not shown) that communicate using HD and MIMO transmissions with the network entity 310.

Figure 4:
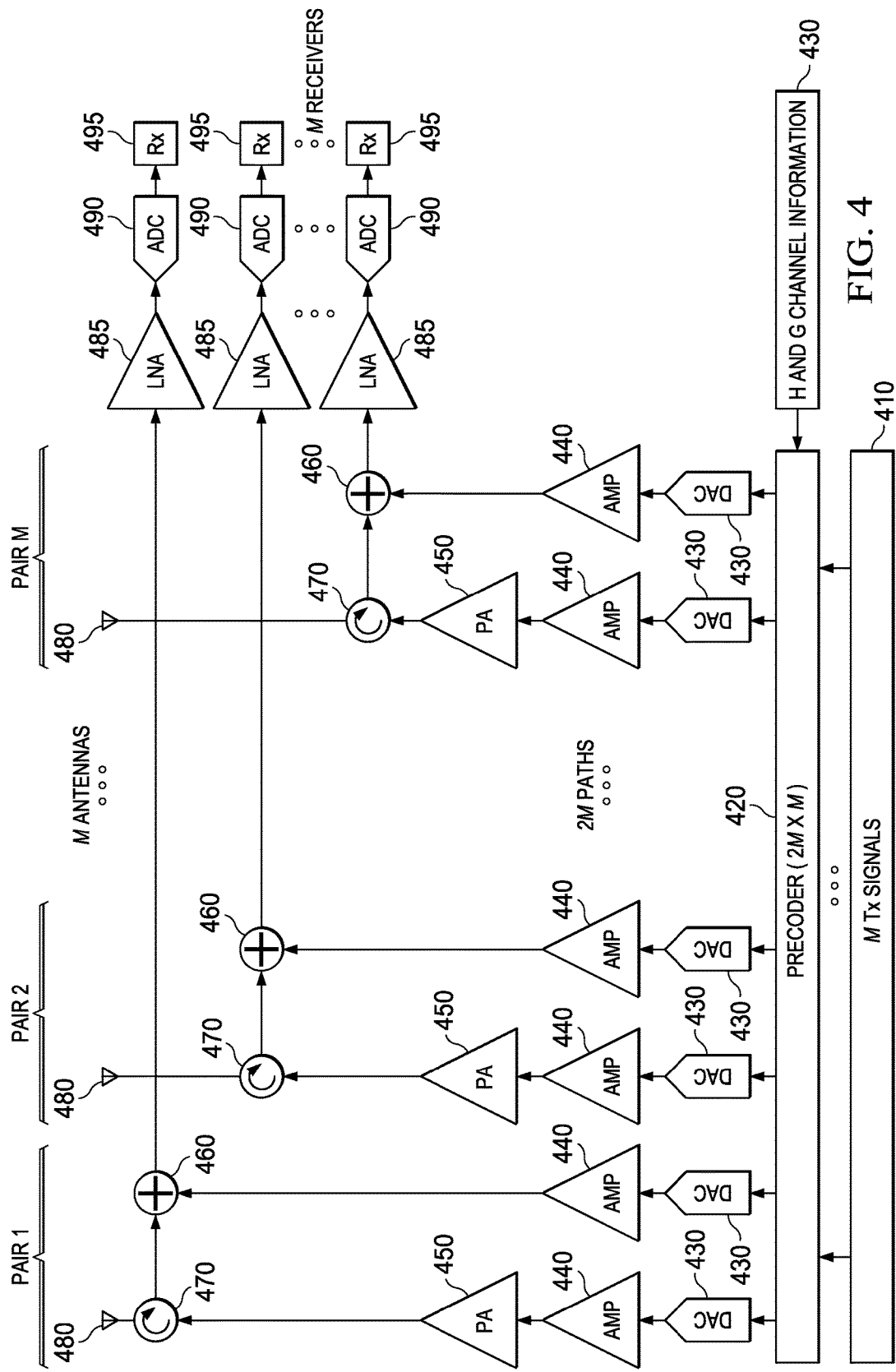
FIG. 4 illustrates an embodiment of a MIMO FD precoding structure.

FIG. 4 illustrates an embodiment of a MIMO FD precoding structure. The precoding structure can be part of an FD transmitter/receiver (transceiver) 400 with M transmit/receive antennas, where M is an integer. For example, the transceiver can correspond to any of the network entities 110, 210 or 310 or the UEs 120 or 320 with FD communications capability in the scenarios above. The M transmit (Tx) signals from transmitter 410 are preprocessed by a precoder 420 using a 2M×M precoding matrix. Using the precoding matrix, the precoder 420 acts as a joint beamformer for forward transmission and self-interference canceller, for instance with the objective of maximizing the sum-rate. The M Tx signals are split into 2M paths, as shown in FIG. 4. Each of the 2M paths includes a Digital-to-Analog Converter (DAC) 430 and an amplifier (Amp) 440.

The 2M paths include a subset of M Tx paths from the precoder 420, which are used for forward transmission. Each of the M Tx paths includes a Power Amplifier (PA) 450, and a circulator 470. A circulator is a passive device in which a signal enters one port and is directed by a circular signal path to the next port of the circulator, where the signal is then sent out. The circulator 470 allows for the transceiver 400 to transmit and receive simultaneously while providing some passive isolation between the M Tx paths from the precoder 420 and the M receive (Rx) paths to the M receivers 495. However, the transceiver 400 can require significantly more cancellation than the circulator 470 provides in order to have reliable signal detection. In another embodiment, an isolator can be used instead of the circulator 470. The isolator is another passive device that allows for the transceiver 400 to transmit and receive simultaneously while providing isolation between the M Tx paths from the precoder 420 and the M Rx paths to the M receivers 495.

The 2M paths also include a second subset of M paths to the combiners 460, referred to herein as M SI cancellation paths, which are used in the structure to cancel the self-interference. The M SI cancellation paths are connected to their respective M Rx paths via combiners 460. The combiners are any suitable devices capable of combining signals together, and are also referred to herein as couplers. Each combiner 460 is positioned between a circulator 470 on the corresponding antenna 480 side and a low noise amplifier (LNA) 485 and an Analog-to-Digital Converter (ADC) 490 on the corresponding receiver 495 side. In each of the M Rx paths, the combiner 460 adds an SI cancellation signal carried by an SI cancellation path. This effectively mitigates SI in the receivers 495. The SI cancellation signals are calculated using the 2M×M precoder 420 with the M Tx paths as part of a joint beam-forming and SI cancellation precoding. The precoding is established using channel information 430 (e.g., H and G channel matrices). The channel information 430 can be obtained via channel measurements, e.g., during a preliminary HD transmission phase.

The precoding structure of the transceiver 400, as shown in FIG. 4, makes use of MIMO precoding to jointly beam-form the transmission and cancel the self-interference. As such, the cancellation is done by matrix precoding. Additionally, this structure allows for different optimization objectives (rather than solely minimizing self-interference). For instance, the Tx signals can be preprocessed using matrix precoding (using the 2M×M precoding matrix at the precoder 420) to maximize the sum-rate and achieve a trade-off between the forward channel beam-forming and the self-interference suppression. Hence, the precoding structure provides a more generalized framework for the optimization of both single-user and multi-user full-duplex transceivers.

As described above, the MIMO FD precoding transceiver structure performs joint beam-forming (for the Tx channel) and SI suppression using precoding, which can be applied for OFDM modulation formats, for instance. This structure also allows for various precoding algorithms and different optimization criteria/objectives to be developed for both single-user (SU) and multi-user (MU) MIMO FD systems. In an embodiment, an FD precoding algorithm is used to jointly optimize a precoding matrix for forward beam-forming and SI suppression. The joint FD precoding algorithm has the potential to effectively trade-off between forward channel optimization and SI cancellation, resulting in sum-rate improvements. In another embodiment, another FD precoding algorithm is used to optimize each of the forward beam-forming and the SI suppression separately. This separate FD precoding algorithm may be implemented with less complexity than the joint FD precoding algorithm. Both algorithms can be performed by the precoder block of the FD precoding transceiver structure in FIG. 4, using the 2M×M precoding matrix.

For the joint FD precoding algorithm, the 2M×M precoding matrix jointly arranges the M Tx channels and the M SI cancellation channels to achieve joint beam-forming for the Tx channels and self-interference suppression in the M Rx channels.

The separate FD precoding algorithm separately optimizes the forward beam-forming and self-interference cancellation, also using the 2M×M precoding matrix. However, a portion of the FD precoding is optimized to maximize the sum-rate assuming zero self-interference, while the other portion of the FD precoding is optimized to suppress the self-interference.

According to the separate FD precoding algorithm, the FD precoding matrix for the i-th node (each node corresponds to an antenna and receiver pair) is set up by designing the FD precoding matrix for forward beam-forming and self-interference cancellation separately as $$V_i = \begin{bmatrix} V_{i,F} \\ V_{i,S} \end{bmatrix}, V_i \in \mathbb{C}^{2M \times M},$$

using a two-step procedure. The first component matrix, $V_{i,F} \in \mathbb{C}^{M \times M}$, is optimized to maximize the sum-rate assuming zero self-interference. The second component matrix, $V_{i,S} \in \mathbb{C}^{M \times M}$, is optimized to suppress self-interference. The self-interference-free rate formula for the i-th node is given by $\tilde{R}_i = \log_2 |I_M + \Sigma_i^{-1} C_{i,j}|$, where the covariance matrix, $C_{i,j}$, can be rewritten as: $C_{i,j} = H_j \tilde{Q}_j H_j^\dagger$, where $H_j = [\tilde{H}_j \ O_M] \in \mathbb{C}^{M \times 2M}$ is the matrix of channel gains from the 2M antenna paths of the transmitter to the M antennas of the receiver, $\tilde{H}_j \in \mathbb{C}^{M \times M}$, and $\tilde{Q}_j = V_{i,F} S_i V_{i,F}^\dagger$. The precoding matrix, $V_{i,F}$, can be optimized by first optimizing $\tilde{Q}_i$ and using the Cholesky decomposition to recover the corresponding optimal $V_{i,F}$. The optimization problem can be transformed into a convex optimization problem and hence can be solved, for instance, using cvx, which is a software package for solving convex problems in Matlab™.

Next, $V_{i,S}$ is optimized so that $\hat{G}_i V_i \approx O_M$, where $\hat{G}_i \in \mathbb{C}^{2M \times M}$ is the estimated self-interference matrix of channel gains for the i-th node, and $O_M$ is a zero matrix. By rewriting $\hat{G}_i$ as $\hat{G}_i = [\hat{G}_{i,a} \ \hat{G}_{i,b}]$, the corresponding $V_{i,S}$ can be derived by solving the following optimization problem for the i-th node: $\min_{V_{i,S}} \|\hat{G}_i V_i\|_F^2$ subject to $\text{Tr}\{V_{i,S} V_{i,S}^\dagger\} \leq P_{max,i}$. This problem can be solved by formulating the Lagrangian for the problem and deriving the gradient of the Lagrangian using the concept of matrix differentials.

In the joint FD precoding algorithm, a sequential convex approximation for matrix-variable programming (SCAMP) algorithm is used to jointly optimize beam-forming for the forward channels and SI cancellation or suppression in the receive channels. This algorithm can effectively achieve trade-off between the optimization of the forward channel and the suppression of the self-interference, resulting in an increased sum-rate.

For the SU-MIMO case, the joint FD precoding algorithm optimizes the precoding matrix, $V_i$, for the i-th node directly by maximizing the sum-rate using sequential convex programming (SCP). An SCP approach is implemented, which makes use of a scheme for solving non-convex matrix-variable optimization problems. The joint optimization can be written as $\max_{Q_1,Q_2} \hat{R}_1 + \hat{R}_2$ (maximizing the sum-rate) subject to $\text{Tr}\{Q_i\} \leq P_{max,i}$, i=1, 2, and $Q_i \geq 0$, i=1, 2, where $Q_i = V_i S_i V_i^\dagger$ is the transmit covariance matrix, and the positive semi-definite constraints ensure the solutions for covariance matrices are feasible. The vectors $\hat{R}_1$ and $\hat{R}_2$ represent the transmission rates for the two communicating entities. Since the 2M×2M covariance matrix is optimized directly, it can be difficult to recover the 2M×M precoding matrix. To avoid this issue, the vector of transmitted signals for the i-th node, x, can be re-written as $$\tilde{x}_i = \begin{bmatrix} x_i \\ 0_M \end{bmatrix}$$

and hence the precoding matrix, $V_i$, becomes a 2M×2M matrix which can be recovered once the optimization problem above is solved using the Cholesky decomposition. Accordingly, $Q_i$ is written as $Q_i = L_i L_i^\dagger$ and hence the precoding matrix can be computed as $V_i = L_i S_i^{1/2}$. Since the last M elements of $\tilde{x}_i$ are zero, the Cholesky decomposition can be applied to the remaining square matrix portion of the 2M×M precoding matrix.

The SCAMP approach makes use of a scheme developed for solving non-convex matrix-variable optimization problems with logarithmic objective functions. Accordingly, the optimization (maximization) problem above can be rewritten as the minimization problem: $\min_{Q_1,Q_2} \hat{f}_{SU-SCAMP}$ subject to $\text{Tr}\{Q_i\} \leq P_{max,i}$ and positive semi-definite $Q_i$, where $\hat{f}_{SU-SCAMP}$ is the SCAMP convex approximation to the objective function $f = -\hat{R}_1 - \hat{R}_2$, and is given by:

$$\hat{f}_{SU-SCAMP} = \sum_{i=1}^{2} \left\{ \eta_i + \tilde{v}_i + \frac{\tilde{t}_i}{\ln(2)} - \beta_i \right\}$$

where $\beta = \log_2 |A + X_0| + \frac{Tr[X_0^{-1}(I + AX_0^{-1})^{-1}A]}{\ln(2)} - \log_2 |X_0|$, $A = I_M$, $X_0 = \left( \sum_i + \hat{G}_i Q_i^0 \hat{G}_i^\dagger \right)^{-1} H_j Q_j^0 H_j^\dagger$, $\eta_i = \log_2 |H_j Q_j^0 H_j^\dagger|$, $\tilde{v}_i = \log_2 |\Upsilon_i^{(n)}| + \frac{1}{\ln(2)} Tr\left[ (\Upsilon_i^{(n)})^{-1} \hat{G}_i (Q_i - Q_i^{(n)}) \hat{G}_i^\dagger \right]$, and $\tilde{t}_i = -Tr\left[ \left( (\Upsilon_i^{(n)})^{-1} H_j Q_j^{(n)} H_j^\dagger (\Upsilon_i^{(n)})^{-1} \right)^\dagger \left( \hat{G}_i (Q_i - Q_i^{(n)}) \hat{G}_i^\dagger \right) \right] +$ -continued $$Tr\left[(\Phi_i(\Upsilon_i^{(n)})^{-1})^\dagger H_j(Q_j - Q_j^{(n)})H_j^\dagger\right] + Tr\left[\Phi_i(\Upsilon_i^{(n)})^{-1} H_j Q_j^{(n)} H_j^\dagger\right],$$

where $\Upsilon_i^{(n)} = \sum_i + \hat{G}_i Q_i^{(n)} \hat{G}_i^\dagger$ $\Phi = X_0^{-1}(I + AX_0^{-1})^{-1} AX_0^{-1}$, $A = I_M$, and $X_0 = \left(\sum_i + \hat{G}_i Q_i^{(n)} \hat{G}_i^\dagger\right)^{-1} H_j Q_j^{(n)} H_j^\dagger.$ The SU-MIMO joint FD precoding-SCAMP algorithm is described in Table 1 below. The algorithm iteratively updates the objective function approximation, $\hat{f}_{SU-SCAMP}$, and solves the convex approximation until convergence. The convex optimization problem can be solved using cvx.

TABLE 1

SU-MIMO: Joint FD precoding algorithm.

Algorithm 1: SU-MIMO: Joint FD precoding algorithm

Randomly initialize $Q_1^{(0)}$, $Q_2^{(0)}$;
Initialize n = 0;
repeat
    Update $\tilde{v}_i$, $\tilde{t}_i$ (i = 1,2) as outlined in ¶ 32 using $Q_1^{(n)}$, $Q_2^{(n)}$;
    Update $\hat{f}_{SU-SCAMP}$ based on ¶ 32;
    Solve the optimization problem outlined in ¶ 28 for $Q_1^*$, $Q_2^*$;
    n = n + 1;
    Update $Q_i^{(n)} = Q_i^*$, i = 1,2;
until $\hat{f}_{SU-SCAMP}$ converges;
Apply Cholesky decomposition: $Q_i^* = L_i L_i^\dagger$, i = 1,2;
Solve for $V_i$ as described in ¶ 31, i = 1,2;

In the SU-MIMO case, the separate FD precoding algorithm can avoid the need for SCP. However, in the multi-user environment, the separate forward beam-former requires solving a non-convex optimization problem. Hence, it may be less attractive to apply the separate FD precoding approach to the MU-MIMO scenario since the result can still be a non-convex optimization problem. For the MU-MIMO environment, a joint FD precoding scheme is used to avoid this issue. The SCAMP algorithm can be applied to the MU-MIMO scenario while making use of the FD precoding scheme. The optimization problem can be rewritten as:

$$\max_{\substack{Q_{BS,k}, Q_{UE,u} \\ k \in I_D, u \in I_U}} R_{DL} + R_{UL} \text{ subject to } Tr\{Q_{MS,u}\} \leq P_{max,u},$$

and $\sum_{k \in I_D} Q_{BS,k} \leq P_{max,BS}$, $Q_{BS,k} \geq 0$, and $Q_{UE,u} \geq 0$ according to positive semi-definite constraints. The vectors $R_{DL}$ and $R_{UL}$ correspond to the rates for downlink (from BSs) and uplink (from UEs), respectively, where k is the index for downlink UEs and u is the index of uplink UEs in the MU-MIMO system. The positive semi-definite constraints ensure the solutions for covariance matrices are feasible. Since the 2M×2M covariance matrix, $Q_{BS,k}$, is optimized directly, it can be difficult to recover the optimal 2M×M precoding matrix. To avoid this issue, the vector of transmitted signals, $\tilde{x}_{BS,k} \geq 0$, from the transmitter entity (e.g., BS) to the receiver entity (e.g., UE) can be rewritten as $$\tilde{x}_{BS,k} = \begin{bmatrix} x_{BS,k} \\ 0_M \end{bmatrix}$$

and hence the precoding matrix, $V_{BS,k}$, becomes a 2M×2M matrix which can be recovered once the optimization problem above is solved using the Cholesky decomposition. Accordingly, $Q_{BS,k}$ is written as $Q_{BS,k} = L_{BS,k} L_{BS,k}^\dagger$ and hence the precoding matrix can be computed as $V_{BS,k} = L_{BS,k} S_{BS,k}^{-1/2}$. Since the last M elements of $\tilde{x}_{BS,k}$ are zero, the Cholesky decomposition can be applied on the remaining square matrix portion. Once the optimization problem above is solved, the corresponding $N_{UE,T} \times N_{UE,T}$ UE precoding matrix, $V_{MS,u}$, can also be recovered using the Cholesky decomposition. Using $Q_{UE,u} = L_{UE,s} L_{UE,u}^\dagger$, the precoding matrix can be computed as: $V_{UE,u} = L_{UE,u} S_{UE,u}^{-1/2}$.

Using the SCAMP approach for this MU MIMO case, the optimization (maximization) problem above can be rewritten as the minimization problem:

$$\min_{\substack{Q_{BS,k}, Q_{UE,u} \\ k \in I_D, u \in I_U}} \hat{f}_{MU-SCAMP} \text{ subject}$$

to $Tr\{Q_{UE,u}\} \leq P_{max,u}$, $\sum_{k \in I_D} Tr\{Q_{BS,k}\} \leq P_{max,BS}$, $Q_{BS,k} \geq 0$, and $Q_{UE,u} \geq 0$, where $\hat{f}_{MU-SCAMP}$ is the SCAMP convex approximation to the objective function $f = -R_{DL} - R_{UL}$, and is expressed as $\hat{f}_{MU-SCAMP} = -\tilde{R}_{DL} - \tilde{R}_{UL}$.

The function $-\tilde{R}_{DL}$ is given by:

$$-\tilde{R}_{DL} = \sum_{k \in I_D} \left\{ \eta_{DL,k} + \tilde{v}_{DL,k} + \frac{\tilde{t}_{DL,k}}{\ln(2)} - \beta_{DL,k} \right\}$$

where $\beta_{DL,k}$ is defined as:

$$\beta = \log_2|A + X_0| + \frac{Tr\left[X_0^{-1}(I + AX_0^{-1})^{-1} A\right]}{\ln(2)} - \log_2|X_0|,$$

$A = I$.

$X_0 = (\Upsilon_{DL,k}^{(n)})^{-1} C_{DL,k}^{(n)},$ and where $\gamma_{DL,k} = \Sigma_k + \hat{C}_{DL,k}$, and $\hat{C}_{DL,k} = \Sigma_{l \in I_D \setminus \{k\}} [H_{DL}]_k^\dagger + \Sigma_{u \in I_U} [\hat{G}_{UE}]_{k,u} Q_{UE,u} [\hat{G}_{UE}]_{k,u}^\dagger.$ The function $\eta_{DL,k}$ is given by:

$\eta_{DL,k} = -\log_2|C_{DL,k}|,$ $$\tilde{v}_{DL,k} = \log_2|\Upsilon_{DL,k}^{(n)}| + Tr\left[\frac{(\Upsilon_{DL,k}^{(n)})^{-1}}{\ln(2)} (\hat{C}_{DL,k} - \hat{C}_{DL,k}^{(n)})\right],$$

and $\tilde{t}_{DL,k} = t_{DL,k}^{(n)} + Tr[(\Phi_{DL,k}(\gamma_{DL,k}^{(n)})^{-1})^\dagger (C_{DL,k} - C_{DL,k}^{(n)})] - Tr[((\gamma_{DL,k}^{(n)})^{-1} C_{DL,k}^{(n)} \Phi_{DL,k} (\gamma_{DL,k}^{(n)})^{-1})^\dagger (\hat{C}_{DL,k} - \hat{C}_{DL,k}^{(n)})],$ where $t_{DL,k}^{(n)}=Tr[\Phi_{DL,k}\Upsilon_{DL,k}C_{DL,k}]$ is evaluated at the point $(Q_{BS,k}^{(n)}, Q_{UE,u}^{(n)})$, for $k \in I_D$ and $u \in I_U$, and $\Phi_{DL,k}$ is given by:

$$\Phi = X_0^{-1}(I+AX_0^{-1})^{-1}AX_0^{-1}$$

with $A=I$ and $X_0=(\Upsilon_{DL,k}^{(n)})^{-1}C_{DL,k}^{(n)}$.

Similarly, the function $-\tilde{R}_{UL}$ is given by:

$$-\tilde{R}_{UL} = \eta_{UL} + \tilde{v}_{UL} + \frac{1}{\ln(2)}\tilde{t}_{UL} - \beta_{UL}$$

where $\beta_{UL}$ is given by:

$$\beta = \log_2|A + X_0| + \frac{Tr[X_0^{-1}(1+AX_0^{-1})^{-1}A]}{\ln(2)} - \log_2|X_0|,$$

with $A = I$, and $$X_0 = (\Upsilon_{UL}^{(n)})^{-1}C_{UL}^{(n)}.$$

Further, $\eta_{UL}$ is given by:

$$\eta_{UL} = -\log_2|C_{UL}|,$$

$$\tilde{v}_{UL} = \log_2|\Upsilon_{UL}^{(n)}| + \frac{1}{\ln(2)}Tr[(\Upsilon_{DL,k}^{(n)})^{-1}(\hat{C}_{UL} - \hat{C}_{UL}^{(n)})], \text{ and}$$

$$\tilde{t}_{UL} = t_{DL,k}^{(n)} + Tr[(\Phi_{UL}(\Upsilon_{UL}^{(n)})^{-1})^{\dagger}(C_{UL} - C_{UL}^{(n)})] -$$
$$Tr[((\Upsilon_{UL}^{(n)})^{-1}C_{UL}^{(n)}\Phi_{UL}(\Upsilon_{UL}^{(n)})^{-1})^{\dagger}(\hat{C}_{UL} - \hat{C}_{UL}^{(n)})],$$

where $t_{UL}^{(n)}=Tr[\Phi_{UL}\Upsilon_{UL}C_{UL}]$ is evaluated at the point $(Q_{BS,k}^{(n)}, Q_{UE,u}^{(n)})$, for $k \in I_D$ and $u \in I_U$, and $\Phi_{UL}$ is given by:

$$\Phi = X_0^{-1}(I+AX_0^{-1})^{-1}AX_0^{-1},$$

with $A=I$, and $$X_0 = (\Upsilon_{UL}^{(n)})^{-1}C_{UL}^{(n)}.$$

The MU-MIMO joint FD precoding-SCAMP algorithm is described in Table 2 below. The algorithm problem above can be solved using cvx.

TABLE 2

MU-MIMO: Joint FD precoding algorithm.
Algorithm 2: MU-MIMO: Joint FD precoding algorithm Randomly initialize $Q_{BS,k}^{(n)}$, $k \in I_D$;
Randomly initialize $Q_{UE,u}^{(n)}$, $u \in I_U$;
Initialize n = 0;
repeat
   Update $Y_{DL,k}^{(n)}$, $\hat{C}_{DL,k}^{(n)}$, $C_{DL,k}^{(n)}$, $Y_{UL}^{(n)}$, $\hat{C}_{UL}^{(n)}$, and $C_{UL}^{(n)}$ centered
    around the point $(Q_{BS,k}^{(n)}, Q_{UE,u}^{(n)})$, $k \in I_D$, $u \in I_U$ as outlined
    in ¶ 35;
   Update $\tilde{v}_{DL,k}$, $t_{DL,k}$, $\tilde{v}_{UL}$, and $\tilde{t}_{UL}$ based on ¶ 35 and ¶ 36;
   Update $-\tilde{R}_{DL}$ and $-\tilde{R}_{UL}$ based on ¶ 36;
   Compute $f_{MU-SCAMP}$ based on ¶ 35;
   Solve for $(Q_{BS,k}^*, Q_{UE,u}^*)$, $k \in I_D$, $u \in I_U$;
   n = n + 1;
   Update $Q_{BS,k}^{(n)} = Q_{BS,k}^*$, $k \in I_D$;
   Update $Q_{UE,u}^{(n)} = Q_{UE,u}^*$, $u \in I_U$;
until $f_{MU-SCAMP}$ converges;
Apply Cholesky decomposition: $Q_{BS,k}^* = L_{BS,k}L_{BS,k}^{\dagger}$;
Apply Cholesky decomposition: $Q_{UE,u}^* = L_{UE,u}L_{UE,u}^{\dagger}$;
Solve for $V_{BS,k}$, $k \in I_D$ based on ¶ 34;
Solve for $V_{UE,u}$, $u \in I_U$ based on ¶ 34;

Further details of the precoding structure, the joint use of the beam-former and SI canceller, and the joint and separate FD precoding algorithms are described by Sean Huberman and Tho Le-Ngoc in a technical paper entitled "MIMO Full Duplex Precoding: A Joint Beamforming and Self-Interference Cancellation Structure," Wireless Communications, IEEE Transactions on, vol. 14, no. 4, pp. 2205-2217, April 2015, which is incorporated herein by reference as if reproduced in its entirety. In other embodiments, similar algorithm designs to the algorithms above can be applied to achieve additional or alternative objectives, such as power minimization, energy efficiency, and bit-error rate minimization.

In an embodiment, the precoding structure of FIG. 4 above can be applied at the base station to operate in FD mode and increase the capacity (bits/second/Hertz/area). This is also applicable to small-cell deployments. The structure can also be applied at a wireless node (e.g., WiFi) and benefits network subscribers by providing significant capacity increases. FD systems are a strong candidate for increasing the capacity of wireless networks. The embodiments herein provide a practical structure for both single-user and multi-user FD systems. In other embodiments, the separate and joint optimization algorithms can be applied to systems that do not use the FD precoding transceiver structure, including both half- and full-duplex wireless and wireline systems.

Figure 5:
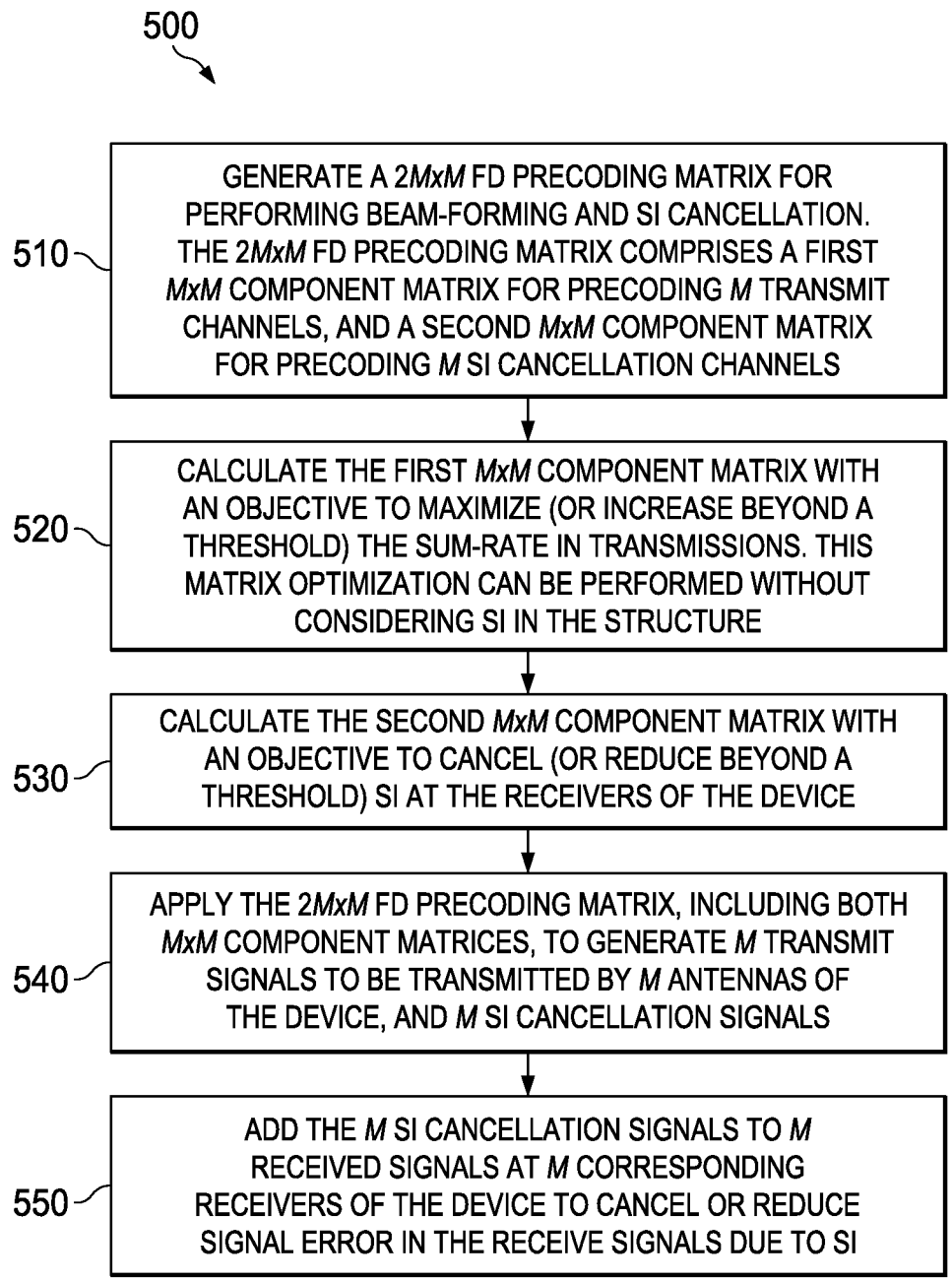
FIG. 5 illustrates an embodiment of a method to implement a separate FD precoding algorithm.

FIG. 5 illustrates an embodiment of a method 500 to implement the separate FD precoding algorithm described above, which can be implemented by the FD precoding structure for MIMO systems. The FD precoding structure can be part of a network entity or a UE. The separate FD precoding algorithm can be used in SU-MIMO, or possibly in MU-MIMO if desired. At step 510, a 2M×M FD precoding matrix is generated, at a precoder in the structure, for performing beam-forming and SI cancellation. The 2M×M FD precoding matrix includes a first M×M component matrix for precoding M Tx signals, and a second M×M component matrix for precoding M SI cancellation signals. At step 520, the first M×M component matrix is calculated with an objective to maximize (or increase beyond a threshold) the sum-rate in transmissions, for instance assuming zero SI at the receivers of the device. At step 530, the second M×M component matrix is calculated with an objective to cancel (or reduce beyond a threshold) SI at the receivers. At step 540, the precoder applies the 2M×M FD precoding matrix, including both M×M component matrices, to generate M transmit signals to be transmitted by M antennas of the device, and M SI cancellation signals. At step 550, the M SI cancellation signals are added to M received signals at M corresponding receivers of the device to cancel or reduce signal error in the receive signals due to SI.

Figure 6:
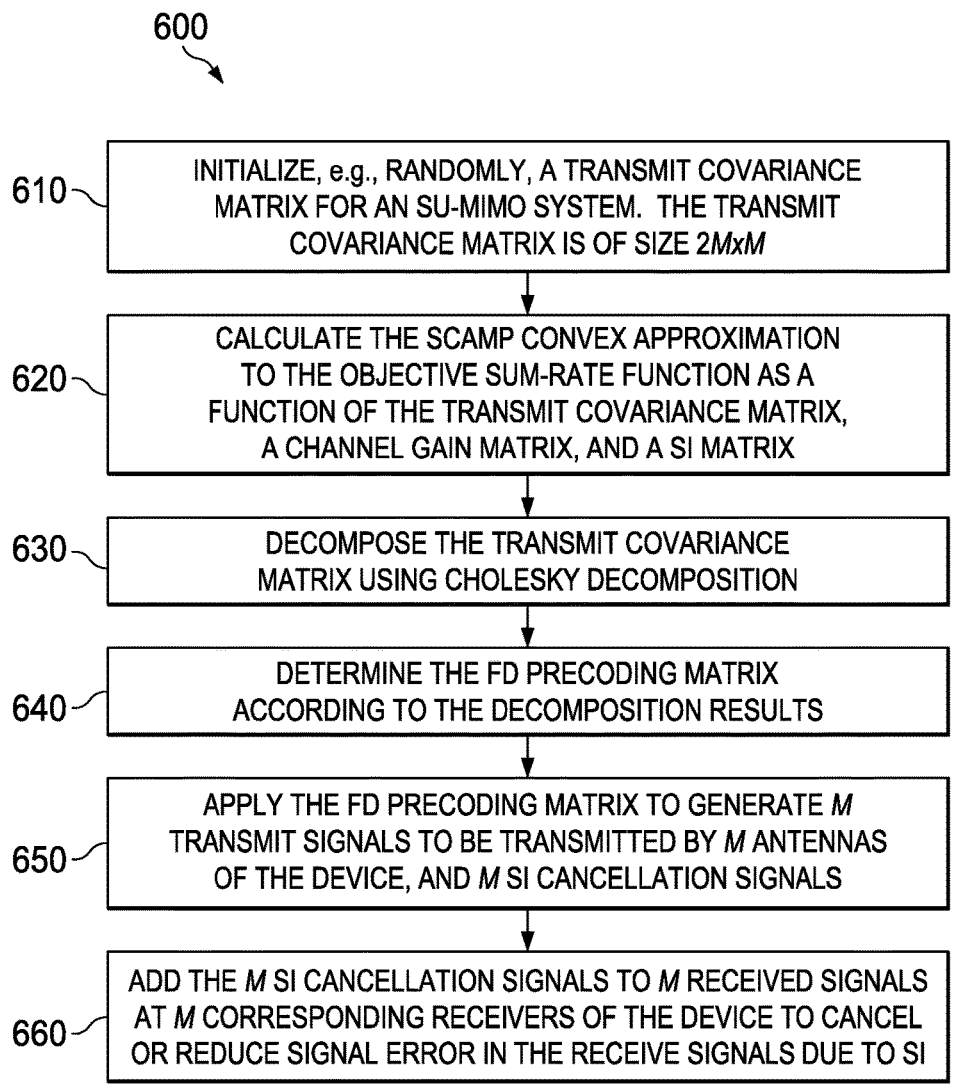
FIG. 6 illustrates an embodiment of a method to implement a joint FD precoding algorithm for a single-user MIMO system.

FIG. 6 illustrates an embodiment of a method 600 to implement the joint FD precoding algorithm described above for SU-MIMO systems. This joint FD precoding algorithm can be implemented by the FD precoding structure, e.g., at a base station or a UE. At step 610, a transmit covariance matrix for the SU-MIMO system is initialized, e.g., randomly, at the precoder. The transmit covariance matrix is of size 2M×2M. At step 620, the SCAMP convex approximation to the objective sum-rate function is calculated as a function of the transmit covariance matrix, a channel gain matrix, and a SI matrix, as described above. The calculation step includes repeating updating the transmit covariance matrix by minimizing (or reducing beyond a threshold) the calculated SCAMP function, and then recalculating the SCAMP convex approximation function accordingly until reaching convergence. At step 630, the transmit covariance matrix is decomposed using Cholesky decomposition. At step 640, the FD precoding matrix is determined according to the decomposition results. At step 650, the precoder applies the FD precoding matrix to generate M transmit signals to be transmitted by M antennas of the device, and M SI cancellation signals. At step 660, the M SI cancellation signals are added to M received signals at M corresponding receivers of the device to cancel or reduce signal error in the receive signals due to SI.

Figure 7:
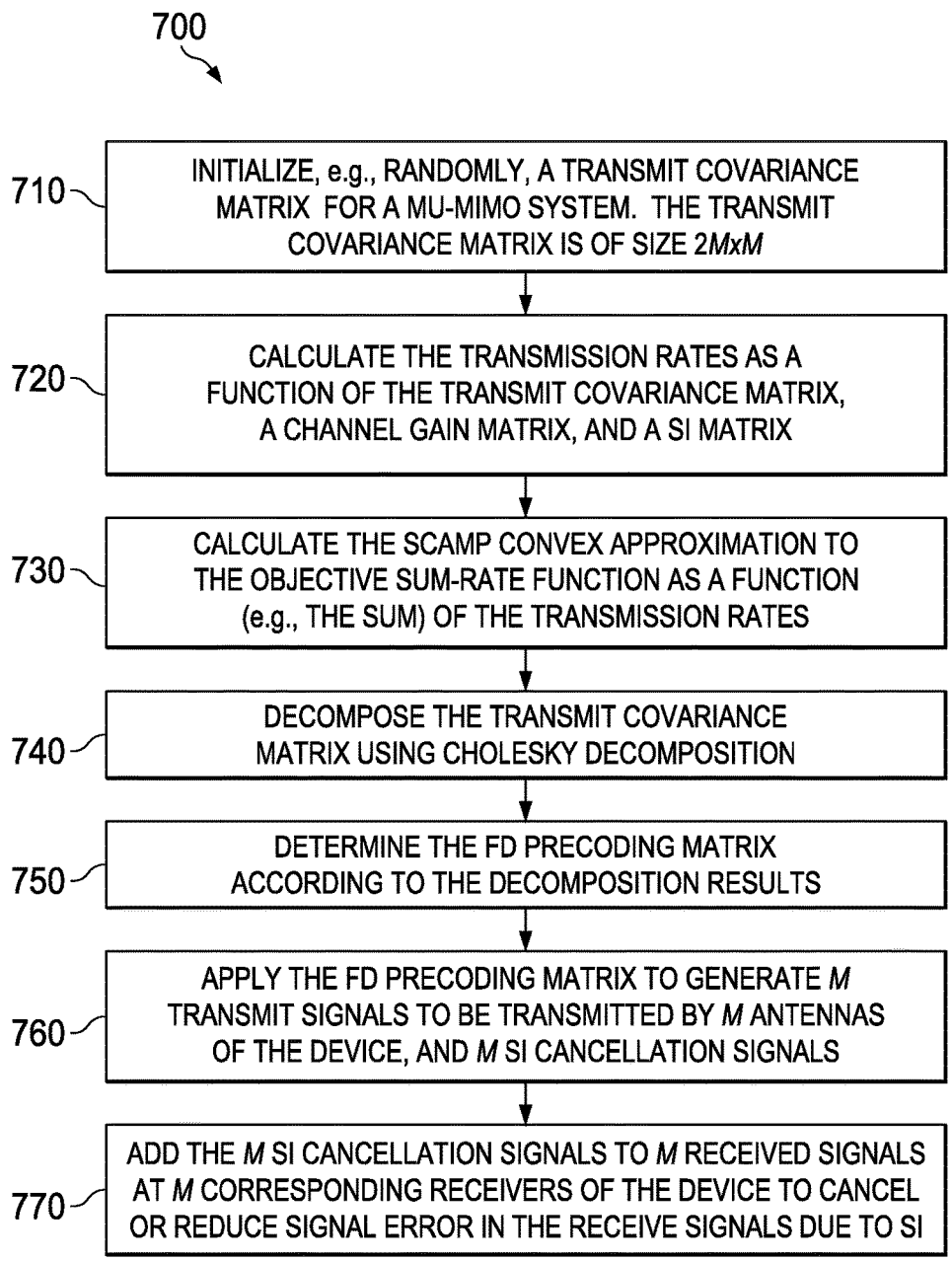
FIG. 7 illustrates an embodiment of a method to implement a joint full-duplex precoding algorithm for a multi-user MIMO system.

FIG. 7 illustrates an embodiment of a method 700 to implement the joint FD precoding algorithm described above for MU-MIMO systems. This joint FD precoding algorithm can be implemented by the FD precoding structure at a network entity or UE. At step 710, a transmit covariance matrix for the MU-MIMO is initialized, e.g., randomly, at the precoder. The transmit covariance matrix is of size 2M×2M. At step 720, the transmission rates (e.g., for the downlink and uplink transmissions) are calculated as a function of the transmit covariance matrix, a channel gain matrix, and a SI matrix, as described above. At step 730, the SCAMP convex approximation to the objective sum-rate function is calculated as a function (e.g., the sum) of the obtained rates (for downlink and uplink). The calculation step includes repeating updating the transmit covariance matrix by minimizing (or reducing beyond a threshold) the calculated SCAMP function, and then recalculating the SCAMP convex approximation function accordingly until reaching convergence. At step 740, the transmit covariance matrix is decomposed using Cholesky decomposition. At step 750, the FD precoding matrix is determined according to the decomposition results of the transmit covariance matrix. At step 760, the precoder applies the FD precoding matrix to generate M transmit signals to be transmitted by M antennas of the device, and M SI cancellation signals. At step 770, the M SI cancellation signals are added to M received signals at M corresponding receivers of the device to cancel or reduce signal error in the receive signals due to SI.

Figure 8:
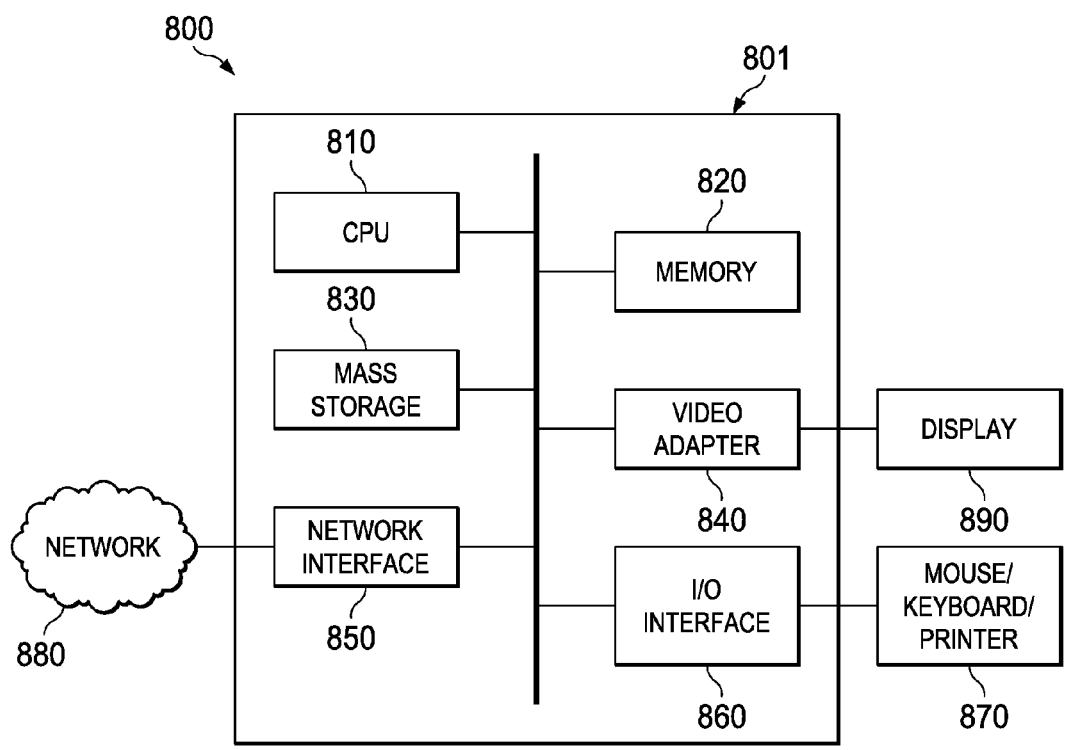
FIG. 8 is a diagram of a processing system that can be used to implement various embodiments.

FIG. 8 is a block diagram of a processing system 800 that can be used to implement various embodiments. For instance the processing system 800 can be part of a UE, such as a smart phone, tablet computer, a laptop, or a desktop computer. The system can also be part of a network entity or component that serves the UE, such as a base station or a WiFi access point. The processing system can also be part of a network component, such as a base station. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 800 may include a processing unit 801 equipped with one or more input/output devices, such as a speaker, microphone, mouse, touchscreen, keypad, keyboard, printer, display, and the like. The processing unit 801 may include a central processing unit (CPU) 810, a memory 820, a mass storage device 830, a video adapter 840, and an I/O interface 860 connected to a bus. The bus may be one or more of any type of several bus architectures including a memory bus or memory controller, a peripheral bus, a video bus, or the like.

The CPU 810 may include any type of electronic data processor. The memory 820 may include any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may include any type of storage device configured to store data, programs, and other information and to make the data, programs, and other information accessible via the bus. The mass storage device 830 may include, for example, one or more of a solid state drive, hard disk drive, a magnetic disk drive, an optical disk drive, or the like.

The video adapter 840 and the I/O interface 860 provide interfaces to couple external input and output devices to the processing unit. As illustrated, examples of input and output devices include a display 890 coupled to the video adapter 840 and any combination of mouse/keyboard/printer 870 coupled to the I/O interface 860. Other devices may be coupled to the processing unit 801, and additional or fewer interface cards may be utilized. For example, a serial interface card (not shown) may be used to provide a serial interface for a printer.

The processing unit 801 also includes one or more network interfaces 850, which may include wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a network component for full-duplex communications in a Multiple-Input and Multiple-Output (MIMO) system, the method comprising:
    initializing, at a precoder, a transmit covariance matrix for precoding a plurality of transmit signals;
    calculating a sequential convex approximation function in accordance with an objective sum-rate for the transmit signals;

decomposing the transmit covariance matrix using Cholesky decomposition;
determining a full-duplex precoding (FDP) matrix in accordance with the decomposing of the transmit covariance matrix;
self-interference (SI) signals corresponding to the transmit signals; and
adding the SI cancellation signals to a plurality of receive signals.

2. The method of claim 1, wherein calculating the sequential convex approximation function includes:
updating the transmit covariance matrix by reducing the sequential convex approximation function below a threshold; and
repeating the calculating and updating until the sequential convex approximation function reaches convergence.

3. The method of claim 1, wherein each one of the SI cancellation signals corresponds to one of the transmit signals.

4. The method of claim 1, wherein the plurality of transmit signals are M transmit signals, and wherein each one of the transmit covariance matrix and the FDP matrix has a size of 2M×2M.

5. The method of claim 1, wherein the network component is one of a wireless base station, a WiFi access point, or a user equipment.

6. The method of claim 1, wherein the sequential convex approximation function is a function of the transmit covariance matrix, a channel gain matrix, and a self-interference (SI) matrix corresponding to the transmit signals.

7. The method of claim 1 further comprising calculating transmission rates of the transmit signals as a function of the transmit covariance matrix, a channel gain matrix, and a self-interference (SI) matrix corresponding to the transmit signals.

8. A network component for full-duplex communications in a Multiple-Input and Multiple-Output (MIMO) system, the network component comprising:
a non-transitory memory storage comprising instructions; and
one or more processors in communication with the memory storage, wherein the one or more processors execute the instructions to:
initialize a transmit covariance matrix for precoding a plurality of transmit signals;
calculate a sequential convex approximation function in accordance with an objective sum-rate for the transmit signals, wherein the sequential convex approximation function is a function of the transmit covariance matrix, a channel gain matrix, and a self-interference (SI) matrix corresponding to the transmit signals;
decompose the transmit covariance matrix using Cholesky decomposition;
determine a full-duplex precoding (FDP) matrix in accordance with the decomposing of the transmit covariance matrix; and
generate, using the FDP matrix, the transmit signals and a plurality of SI cancellation signals corresponding to the transmit signals.

9. The network component of claim 8 further comprising:
a plurality of receivers coupled to a plurality of antennas;
a plurality of combiners configured to add the SI cancellation signals to a plurality of receive signals;
a circulator or isolator positioned on each transmit path between the one or more processors and each antenna; and
an auxiliary path between the one or more processors and each combiner.

10. The network component of claim 9, wherein each transmit path includes a digital to analog converter (DAC) and an amplifier, wherein each combiner is positioned on a receive path between the circulator or isolator of each transmit path and a corresponding receiver of the plurality of receivers, wherein the receive path includes a low noise amplifier (LNA) and an analog to digital converter (ADC), and wherein the auxiliary path includes a digital to analog converters (DAC) and a second amplifier.

11. The network component of claim 8, wherein the network component is one of a wireless base station, a WiFi access point, or a user equipment.

12. A network component for full-duplex communications in a Multiple-Input and Multiple-Output (MIMO) system, the network component comprising:
a non-transitory memory storage comprising instructions; and
one or more processors in communication with the memory storage, wherein the one or more processors execute the instructions to:
initialize a transmit covariance matrix for precoding a plurality of transmit signals;
calculate transmission rates of the transmit signals as a function of the transmit covariance matrix, a channel gain matrix, and a self-interference (SI) matrix corresponding to the transmit signals;
calculate a sequential convex approximation function in accordance with an objective sum-rate for the transmit signals;
decompose the transmit covariance matrix using Cholesky decomposition;
determine a full-duplex precoding (FDP) matrix in accordance with the decomposing of the transmit covariance matrix; and
generate, using the FDP matrix, the transmit signals and a plurality of SI cancellation signals corresponding to the transmit signals.

13. The network component of claim 12 further comprising:
a plurality of receivers coupled to a plurality of antennas;
a plurality of combiners configured to adding the SI cancellation signals to a plurality of receive signals;
a circulator or isolator positioned on each transmit path between the one or more processors and each antenna; and
an auxiliary path between the one or more processors and each combiner.

14. The network component of claim 13, wherein each transmit path includes a digital to analog converter (DAC) and an amplifier, wherein each combiner is positioned on a receive path between the circulator or isolator of each transmit path and a corresponding receiver of the plurality of receivers, wherein the receive path includes a low noise amplifier (LNA) and an analog to digital converter (ADC), and wherein the auxiliary path includes a digital to analog converter (DAC) and a second amplifier.

15. The network component of claim 12, wherein the network component is one of a wireless base station, a WiFi access point, or a user equipment.

16. A network component for full-duplex communications in a Multiple-Input and Multiple-Output (MIMO) system, the network component comprising:
a non-transitory memory storage comprising instructions; and one or more processors in communication with the memory storage, wherein the one or more processors execute the instructions to:
  initialize a transmit covariance matrix for precoding a plurality of transmit signals;
  calculate a sequential convex approximation function in accordance with an objective sum-rate for the transmit signals;
  decompose the transmit covariance matrix using Cholesky decomposition;
  determine a full-duplex precoding (FDP) matrix in accordance with the decomposing of the transmit covariance matrix;
  self-interference (SI) cancellation signals corresponding to the transmit signals; and
  add the SI cancellation signals to a plurality of receive signals.

17. The network component of claim 16, wherein the one or more processors execute the instructions to calculate the sequential convex approximation function includes the one or more processors execute the instructions to:
  update the transmit covariance matrix by reducing the sequential convex approximation function below a threshold; and
  repeat the calculate and update until the sequential convex approximation function reaches convergence.

18. The network component of claim 16, wherein each one of the SI cancellation signals corresponds to one of the transmit signals.

19. The network component of claim 16, wherein the plurality of transmit signals are M transmit signals, and wherein each one of the transmit covariance matrix and the FDP matrix has a size of 2M×2M.

20. The network component of claim 16, wherein the network component is one of a wireless base station, a WiFi access point, or a user equipment.

21. The network component of claim 16, wherein the sequential convex approximation function is a function of the transmit covariance matrix, a channel gain matrix, and a self-interference (SI) matrix corresponding to the transmit signals.

22. The network component of claim 16, wherein the one or more processors execute the instructions to calculate transmission rates of the transmit signals as a function of the transmit covariance matrix, a channel gain matrix, and a self-interference (SI) matrix corresponding to the transmit signals.

23. A method performed by a network component for full-duplex communications in a Multiple-Input and Multiple-Output (MIMO) system, the method comprising:
  initializing a transmit covariance matrix for precoding a plurality of transmit signals;
  calculating a sequential convex approximation function in accordance with an objective sum-rate for the transmit signals, the sequential convex approximation function being a function of the transmit covariance matrix, a channel gain matrix, and a self-interference (SI) matrix corresponding to the transmit signals;
  decomposing the transmit covariance matrix using Cholesky decomposition;
  determining a full-duplex precoding (FDP) matrix in accordance with the decomposing of the transmit covariance matrix; and
  generating, using the FDP matrix, the transmit signals and a plurality of SI cancellation signals corresponding to the transmit signals.

24. The method of claim 23, further comprising adding the SI cancellation signals to a plurality of receive signals.

* * * * *